| (12) | United States Patent<br>Conrad et al. | (10) Patent No.: US 11,055,744 B2<br>(45) Date of Patent: Jul. 6, 2021 |
|---|---|---|

(54) SYSTEM AND METHOD FOR GENERATING A TRACKED MESSAGE

(71) Applicants: Jay Conrad, Wagener, SC (US); Anthony Link, Boca Raton, FL (US)

(72) Inventors: Jay Conrad, Wagener, SC (US); Anthony Link, Boca Raton, FL (US)

( * ) Notice: Subject to any disclaimer, the term of this patent is extended or adjusted under 35 U.S.C. 154(b) by 52 days.

(21) Appl. No.: 15/684,926

(22) Filed: Aug. 23, 2017

(65) Prior Publication Data

US 2018/0060914 A1 Mar. 1, 2018

Related U.S. Application Data

(60) Provisional application No. 62/378,461, filed on Aug. 23, 2016.

(51) Int. Cl.
| G06Q 30/02 | (2012.01) |
| H04L 29/08 | (2006.01) |
| H04L 12/58 | (2006.01) |
| G06Q 10/10 | (2012.01) |
| G06Q 50/00 | (2012.01) |

(52) U.S. Cl.
CPC ..... *G06Q 30/0267* (2013.01); *G06Q 30/0277* (2013.01); *H04L 51/18* (2013.01); *H04L 67/146* (2013.01); *H04L 67/20* (2013.01); *G06Q 10/107* (2013.01); *G06Q 50/01* (2013.01)

(58) Field of Classification Search
CPC .......... G06Q 30/0267; G06Q 30/0277; G06Q 10/107; G06Q 50/01; H04L 51/18; H04L 67/146; H04L 67/20

USPC ........................................ 705/14, 319, 14.64
See application file for complete search history.

(56) References Cited

U.S. PATENT DOCUMENTS

| 8,521,832 B1* | 8/2013 | Whittaker .......... G06Q 30/0246<br>709/217 |
| 2012/0297451 A1* | 11/2012 | Ozzie ...................... G06F 21/31<br>726/3 |
| 2014/0114761 A1* | 4/2014 | Lee .................... G06Q 30/0241<br>705/14.54 |
| 2014/0129733 A1* | 5/2014 | Klais ...................... H04L 45/22<br>709/239 |
| 2014/0200989 A1* | 7/2014 | Cohen Kassko .. G06Q 30/0243<br>705/14.42 |
| 2015/0178784 A1* | 6/2015 | Oliver ................ G06Q 30/0267<br>705/14.64 |
| 2015/0206177 A1* | 7/2015 | Yao .................... G06Q 30/0246<br>705/14.45 |

(Continued)

OTHER PUBLICATIONS

Mobile Technologies and the Value Chain (Year: 2006).*
Consumer Attitudes toward SMS Advertising among Jordanian Users (Year: 2012).*

*Primary Examiner* — Gautam Ubale
(74) *Attorney, Agent, or Firm* — Allen F. Bennett; Bennett Intellectual Property

(57) ABSTRACT

A method or process for generating an attributable and trackable message based engagement through SMS or IP based messaging unit, from within a single unified campaign platform environment, between internet connected devices on any open or closed content delivery networks, servers, website, or social media sites such that the intent and messaging sequence may be tracked and attributed to campaigns, specified audiences, and ad platforms.

2 Claims, 17 Drawing Sheets

CAMPAIGN INTERACTION PROCESS - Detail- Client Campaign Asset Server

(56) References Cited

U.S. PATENT DOCUMENTS

2016/0198509 A1\* 7/2016 Hayes, Jr. .............. G06Q 30/02
370/329

\* cited by examiner

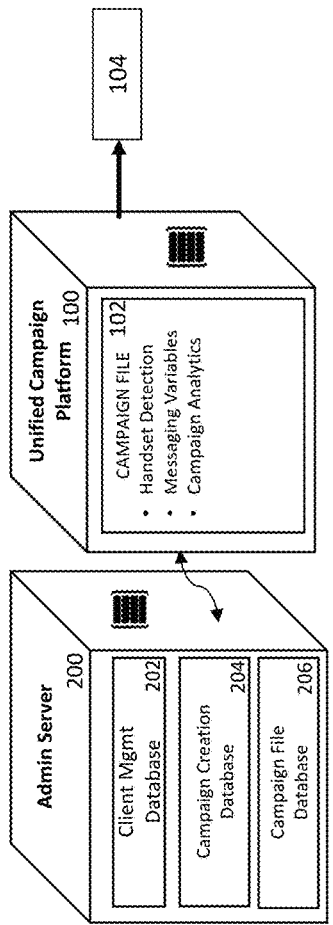

Figure 6

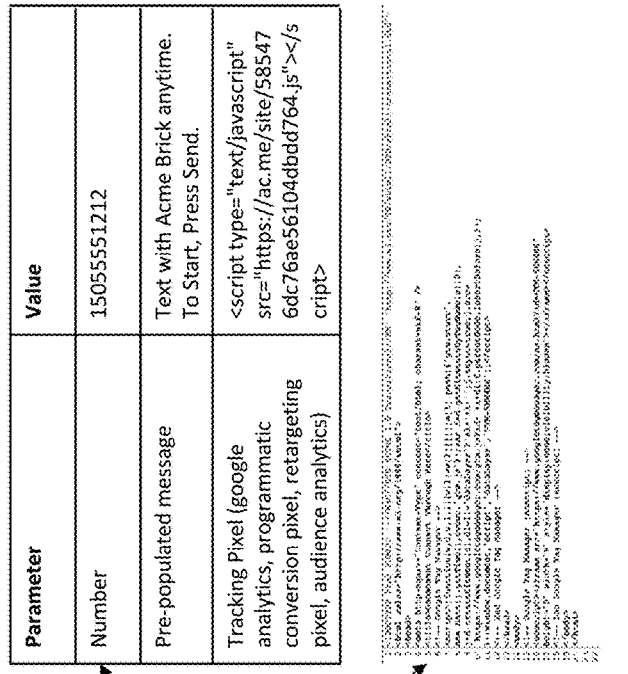

SETUP Flow Diagram

220 → Collect and Write client contact information to admin server

222 → Collect campaign parameters in campaign creation database of admin server

224 → Combine campaign parameters into executable campaign file of unified campaign platform with elements 102a, 102b, 102c as defined.

226 → Place campaign file in Internet connected Unified Campaign Platform-100

228 → Campaign CTA URL(104) is generated with standard http or https web protocol

Figure 5

CAMPAIGN FILE (102) CREATION INTERFACE

← ⟳ ⓘ click.us/tg/single-tag.html

CLiCX - Tag Generator for GTM. Wow.

CompanyName
CompanyDomain
TagPagePath
UniqueTagName
CompanyNumber
NumberSirenApiKey
CompanyGAid
ThirdParty5A
publicId
containerId
process   Download Copy to clipboard Debug Status
building form:
form: built
fetching generic-template.json
generic-template.json fetched

Figure 7

CAMPAIGN PUBLISHING PROCESS

APPLICATION SERVICE PROVIDER MESSAGING ANALYTICS

Reports

Message Counts for 13056906036
August 08 2017 EST to August 09 2017

Received messages can be sorted by the pre-populated number from 102b or by campaign specific pre-populated message from 102b

Figure 20

SYSTEM AND METHOD FOR GENERATING A TRACKED MESSAGE

CROSS-REFERENCES TO RELATED APPLICATIONS

This application claims the benefit of U.S. provisional patent application No. 62/378,461, which was filed on Aug. 23, 2016 which claimed the benefit of the earlier filed non-provisional patent application Ser. No. 62/195,748 which was filed on Jul. 22, 2015, the disclosure of which is expressly incorporated by reference herein.

FIELD OF THE INVENTION

The present invention is broadly directed to a method or process for automatically generating an SMS (Short Message Service) or IP (Internet Protocol) based messaging unit on a handheld device, from within a single unified campaign platform environment, between internet connected devices through any open or closed content delivery networks, servers, website, or social media sites such that the initiating of a messaging unit may reported to a third party tracking server.

BACKGROUND OF THE INVENTION

Internet usage is continuing to dominate the marketplace and advertising companies use the internet to promote and market the goods and services of companies with interested users interested in those products and/or services. IP addresses are often assigned to an internet user and while they are temporal they are uniquely associated with a specific internet user. While many businesses use the internet to marketing and promote their products and services to various users it is difficult to measure and correlate direct conversions of those efforts upon a bottom-line financial performance of a company or its marketing efforts.

If information about the user can be determined, targeted product and service offerings may be provided. One marketing objective may be to obtain an e-mail address in exchange for providing the user a product or service. However, these e-mail addresses are invalid identified and even if valid marketers often struggle to correlate the receipt of a marketing email with the financial transaction.

For example, a user casually browsing a website offering access to a featured product may follow a link to the product but turn back if asked to enter an e-mail address. This problem is particularly acute in mobile computing environments, e.g., smartphones, with limited input and navigation options as well as small screens. This also applies generally to browser environments that present hurdles to data entry.

In the example above, a link may be provided within the body of an email sent to the user which may be considered a call to action, or a CTA. A CTA may take the form of a banner, button, graphic, and/or text etc. embedded within a webpage or email which is displayed on the display screen which prompts a user to preform a specific action such as click on the link or graphic. The number of users who may receive the email, display the embedded graphics contained within the email on a screen and select on a link embedded within the displayed graphic will narrow and reflects the fact that a increasingly small portion of users who visit a page with information specific to a particular product or service, will actually act upon the information provided and complete a financial purchase transaction associated with the provided information. Conversion statistics decrease sharply in relation to the number of steps required for the user to act. As a result, businesses and companies lose out on important opportunities to establish purchase transactions with interested users.

Some marketing campaigns may first require express permission from the interested user prior to sending an email or link. In some cases, only after the internet user has expressly agreed to receive the marketing communication, may the marketer send consumer based marketing materials or message. For example, in the United Kingdom, an opt-in is required for e-mail marketing by the Privacy and Electronic Communications Regulations (PECR) which along with the Data Protection Act, limit the ability of companies to market to consumer by collecting cookies, sending emails, texts or faxes. Many such regulations exist, which frequently vary from country to country. Such regulations may challenge transnational marketing efforts by calling upon providers to adapt offerings, as well as customize policies, e.g., privacy policies, terms of service, enrollment, etc., depending on the national origin of the requesting user device.

Based in part on the foregoing challenges, their exists a need for a system, and/or method for automatically transitioning a user from a marketing campaign which includes a call-to-action using IP or SMS communications from a mobile device to a third party server and a campaign tracking server to evaluate a consumer purchase interface.

In an example embodiment, a link is automatically selected from a plurality of links displayed upon a handheld device which automatically launches an internet or text based client associated with the requesting device and automatically generates message based on the selected link, and populates recipient and subject line fields with an address and a code associated with the selected link, preparing user and device specific data for transmission to a remote server based on the automatically selected link. By automatically generating an electronic message that includes device and user data, along with associated authorization codes, the system can remove barriers for a purchase transaction while better tracking and monitoring conversion data. Thus, the current system and method address some of the problems with the aforementioned marketing efforts by providing an improved marketing campaign communication and tracking system using an SMS or IP based messaging unit.

SUMMARY OF THE INVENTION

The need for the present invention are met, to a great extent, by the present invention wherein in one aspect a system/method is provided that in some embodiments will presents a method or a process for generating an SMS (Short Message Service) or IP (Internet Protocol) based messaging unit, from within a single unified campaign platform environment, between internet connected devices through any open or closed content delivery networks, servers, website, or social media sites such that the initiating of a messaging unit may reported to a third party tracking servers.

One embodiment of the exemplary method and process generates a URL when a mobile user clicks, the exemplary method and process automatically populates a complete messaging unit from within a single unified campaign platform on a mobile users device for delivery on the SMS network or an IP based messaging platform based on a phone number (SMS) or user id (IP based messaging network). Furthermore, the embodiment of this method or process includes the ability to track the entire engagement process through the unique integration of third party analytics into an ad network platform and a messaging platform.

Certain embodiments of the invention are outlined above in order that the detailed description thereof may be better understood, and in order that the present contributes to the art may be better appreciated. There are, of course, additional embodiments of the invention that will be described below and which will form the subject matter of the claims appended hereto.

In this respect, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein as well as the abstract are for the purposes of description and should not be regarded as limiting.

As such, those skilled in the relevant art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

Further features of the present invention will become apparent to those skilled in the art to which the present invention relates from reading the following description with reference to the accompanying drawings, in which a better understanding of the present invention is depicted, in which:

FIG. 5 is an exemplary Setup flow block diagram consistent with an exemplary flow for the Setup Process in accordance with an exemplary embodiment of the present invention.

FIG. 6 is an exemplary system diagram for the Setup Process illustrating an exemplary architecture of the setup process in accordance with an embodiment of the present invention.

FIG. 7 is an exemplary Campaign File Creation Interface in accordance with an embodiment of the present invention.

FIG. 20 is an exemplary report illustrating the Application Service Provider Messaging Analytics.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
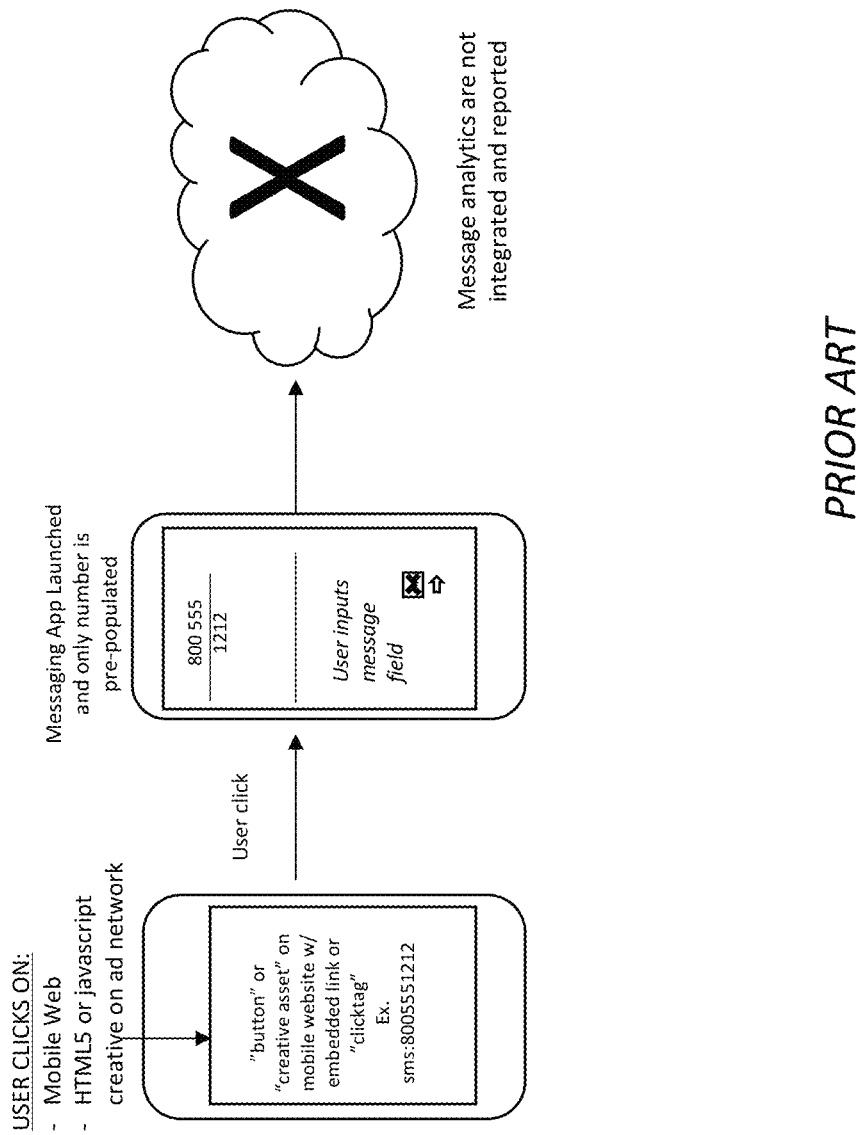
FIG. 1 is an exemplary system flow diagram of an exemplary prior art embodiment of a method for generating an SMS or IP based message.

Referring to the drawings in more detail, FIG. 1 shows an exemplary embodiment of the prior art process for manually generating a message from a single device specific environment. This process illustrates devices connected via the interne through a content delivery network which may include, but is not limited to, communications between client-server, server-server, application-server, browser-website server or client app-social media servers. As illustrated, the message is manually generated on a single device using the device input and output requirements for manual transmission from the device to a third-party server, website or social media site through a network. If the third party and the device are configured, tracking and embeddable metadata including statistical and demographic information is separately recorded and selectively transmitted.

FIG. 1 illustrates an exemplary prior art process for generating an SMS or IP based messaging unit, from within a single environment. As illustrated the message is generated directly on the mobile device with the user clicking on a client application. Using current methods, a messaging app may be launched on the device with only a contact number pre-populated. Typical communications occurs between internet connected devices and content delivery networks, servers, websites or social media sites such that the initiation of a message unit may be tracked and reported by a third party tracking server. As indicated, third party tracking is provided externally and through a separate system instead of providing a means to monitor or track within the same environment. In the exemplary prior art embodiment, HTTP based analytics are not integrated and automatically reported because the CTA URL uses the SMS protocol which is not compatible with standard (HTTP) internet protocol and analytics.

Figure 2:
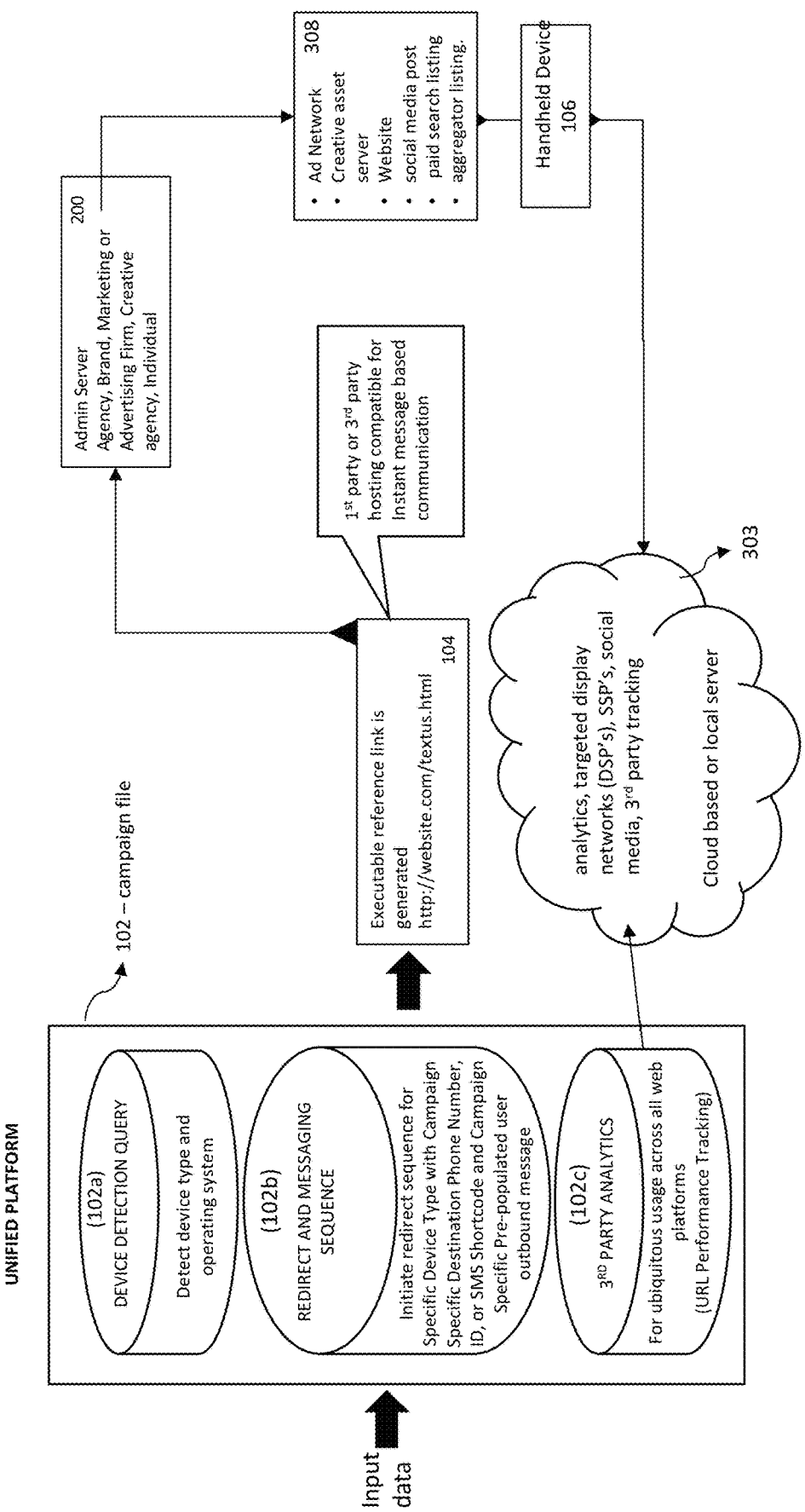
FIG. 2 is an exemplary system block diagram illustrating various components of a unified campaign platform embodiment in accordance with an exemplary embodiment of the present invention.

FIG. 2 illustrates an exemplary embodiment of the present invention with a unified campaign platform receiving input data to create a campaign file 102 used to content server in communication with a unified campaign platform 100 which generates an call to action executable reference link 104 which is transmittable to an Admin Server 200 and then transmitted to the Ad Network 308 for placement and receipt by a Handheld Device 106. Generally, the executable reference link 104 is programmed for instant message based communication. The Admin Server 200 may be affiliated with an advertising based company and include affiliate data associated with a particular agency, brand, marketing or advertising firm, creative agency or individual. The Ad Network 308 may include creative asset server, website, social media post, paid search listing and aggregator listing which provides the affiliate data to be associated with the executable reference link. Alternative, the communication may be directed through a remote "cloud based server."

The unified campaign platform 100 generally receives input data and processing the input data based on a number of steps which includes a device detection query 102a, a redirect and messaging sequence 102b and a third party analytics reporting process 102c. The device detection step 102a generally takes the input data and uses it to detect the user's mobile device including device type and operating system. The redirect and messaging sequence 102b takes the input data and preforms a redirection based upon the received input data which may include, but is not limited to a specific users' mobile device type. The unified campaign platform 100 then reviews the campaign specific input data which may include campaign specific destination phone number, campaign identification, SMS, short code and campaign specific pre-populated user message data and assembles a campaign file 102. Once the campaign file is assembled, third party tracking information is provided which may be used to monitor analytics including targeted display networks, social media, and third party tracking websites or platforms.

Figure 3:
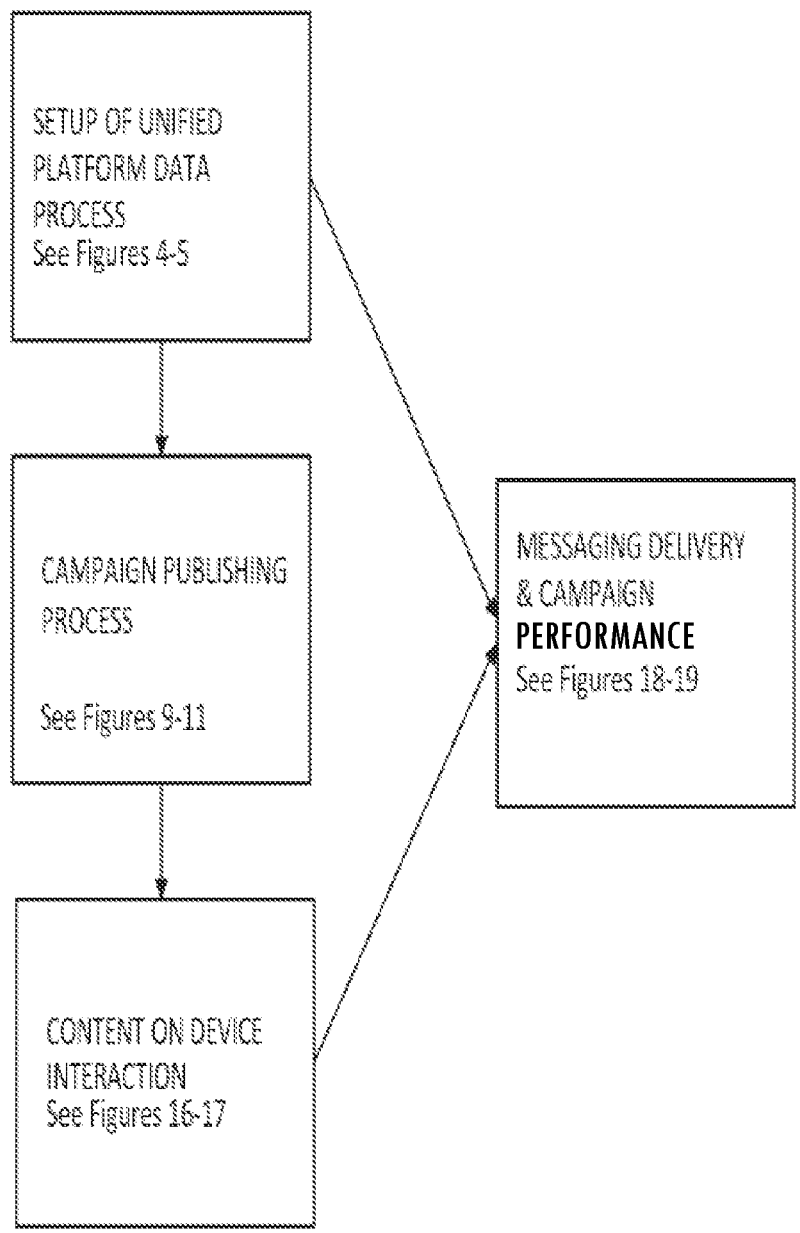
FIG. 3 is an exemplary system block diagram illustrating exemplary processes in an exemplary system in accordance with the present invention.
Figure 4:
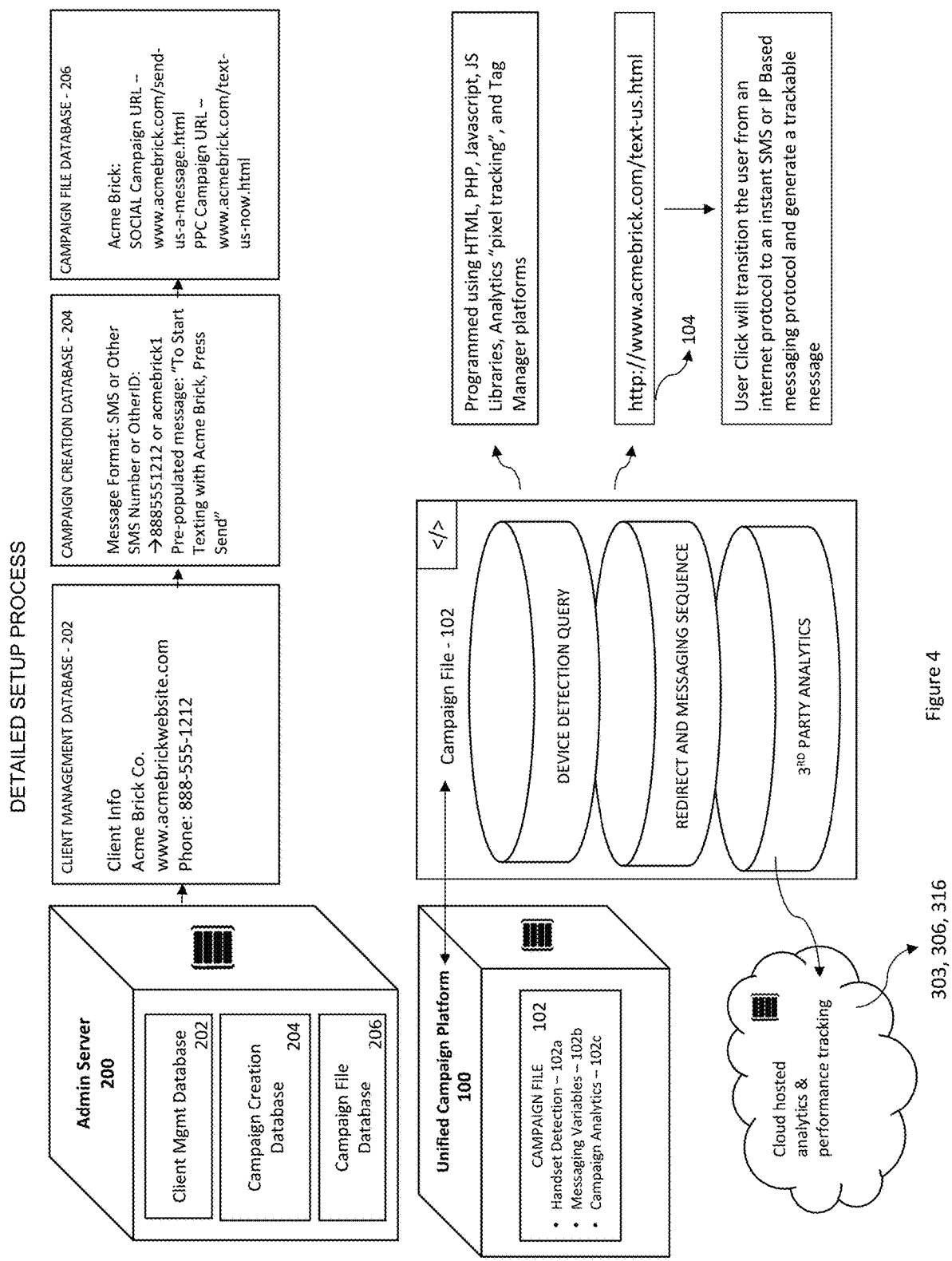
FIG. 4 is an exemplary detailed setup process consistent with an exemplary embodiment in accordance with the present invention.
Figure 9:
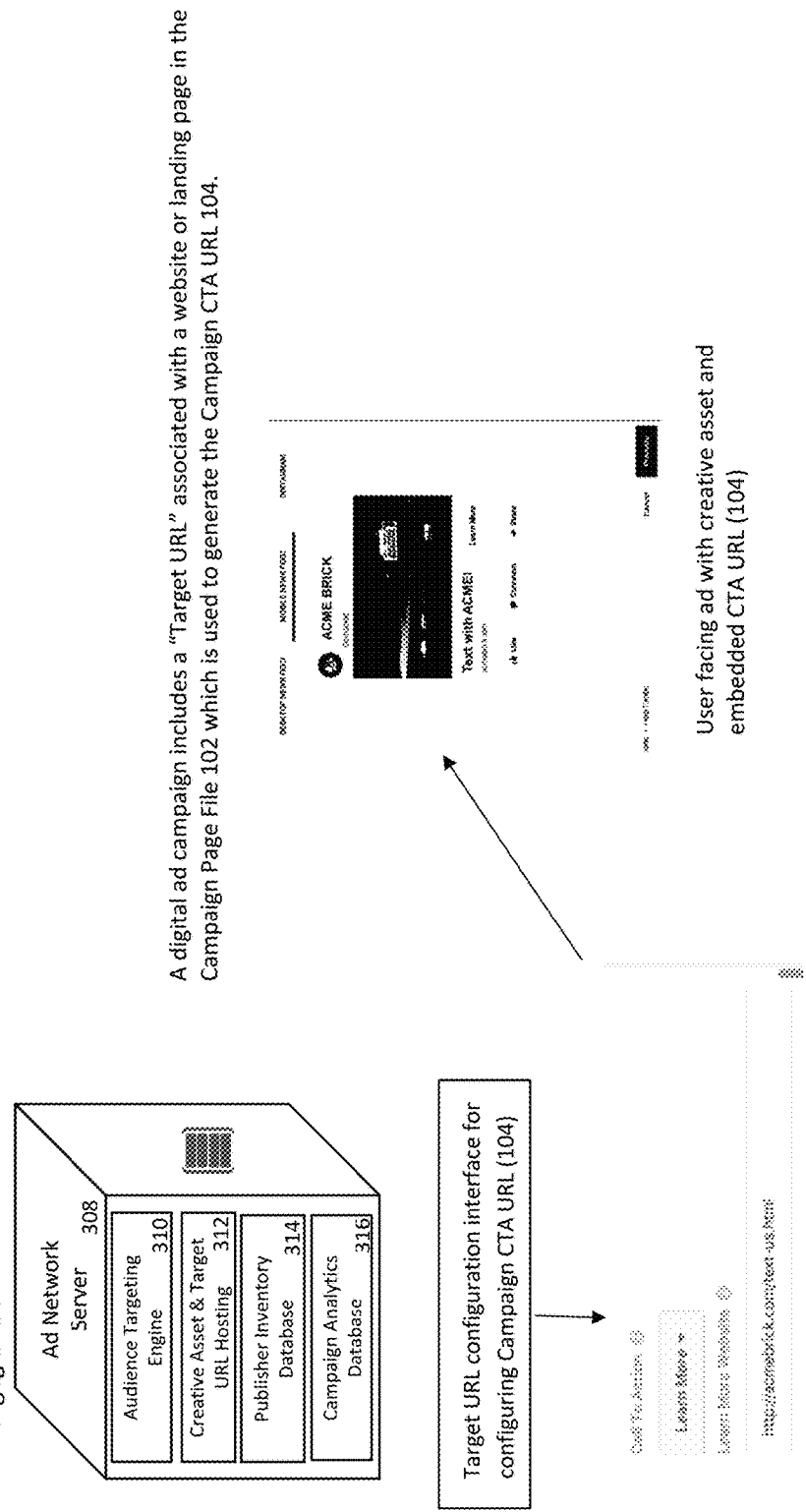
FIG. 9 is an exemplary system diagram for an Advertising Network Server in accordance with an exemplary CTA Target URL configuration interface illustrating an exemplary display of a digital ad campaign showing the Target URL in accordance with an embodiment of the present invention.
Figure 10:
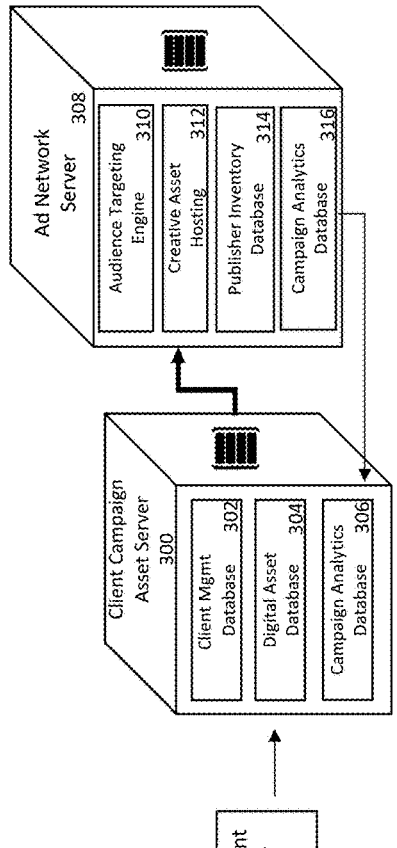
FIG. 10 is an exemplary system block diagram illustrating an embodiment of the Campaign Publishing architecture in accordance with one embodiment of the present invention.
Figure 11:
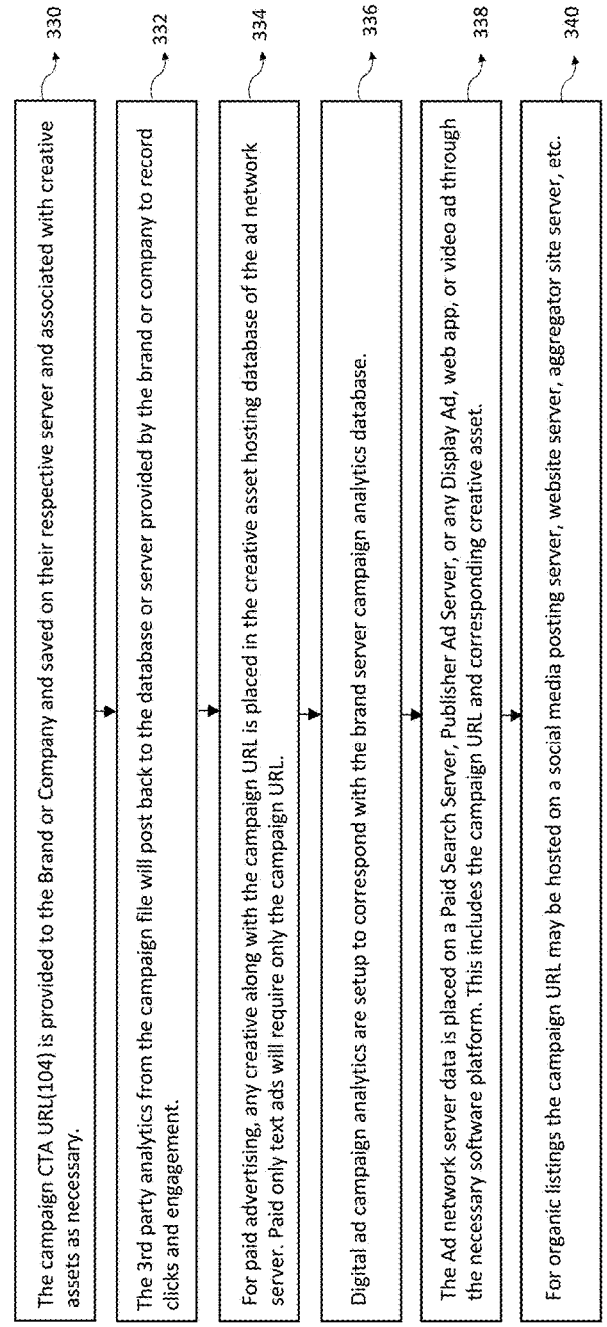
FIG. 11 is an exemplary flow block diagram of the Campaign Publishing Process in accordance with one embodiment of the present invention.
Figure 14:
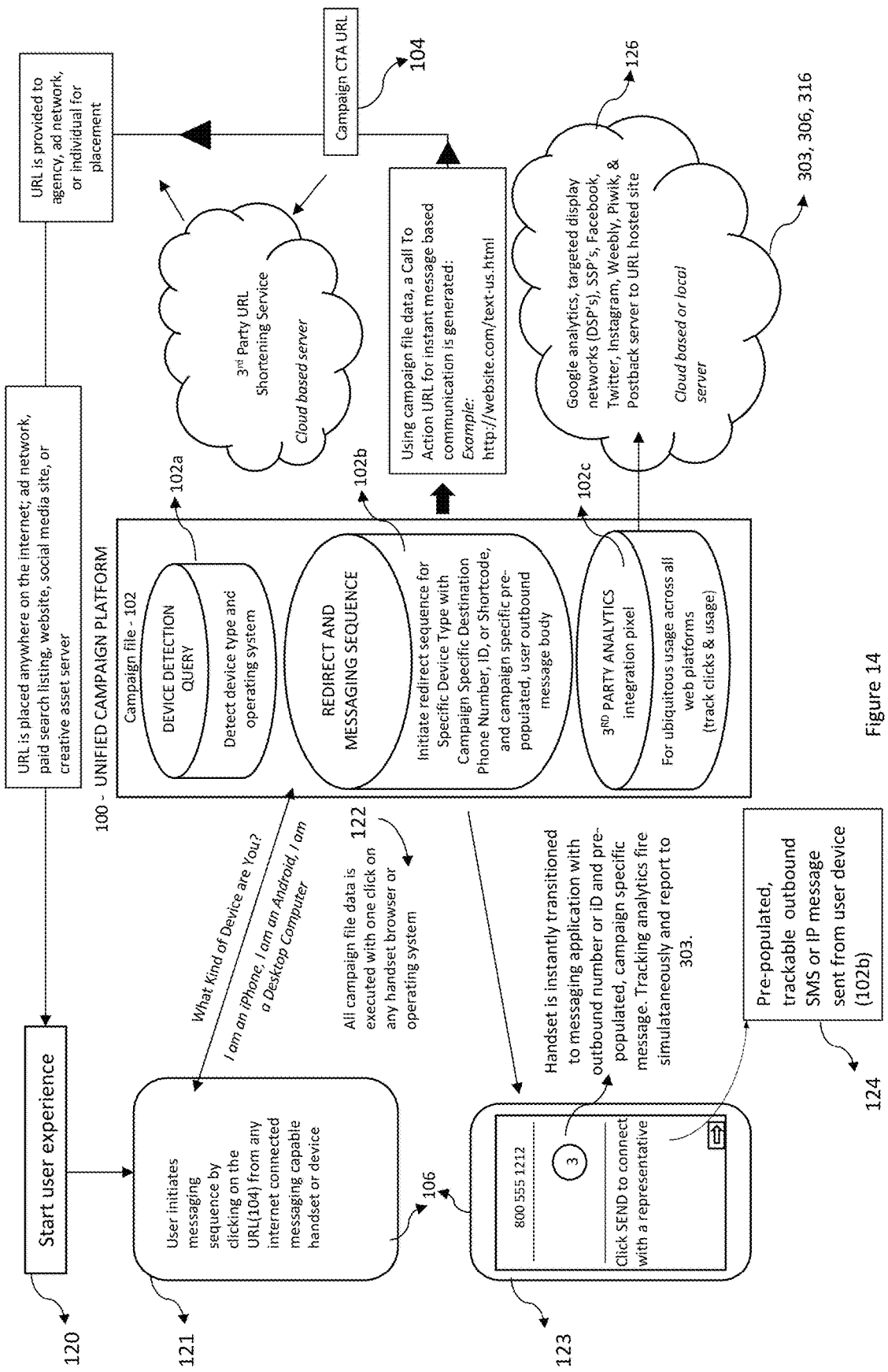
FIG. 14 is an Exemplary User System Interaction Diagram illustrating exemplary system interactions in accordance with an embodiment of the present invention.
Figure 15:
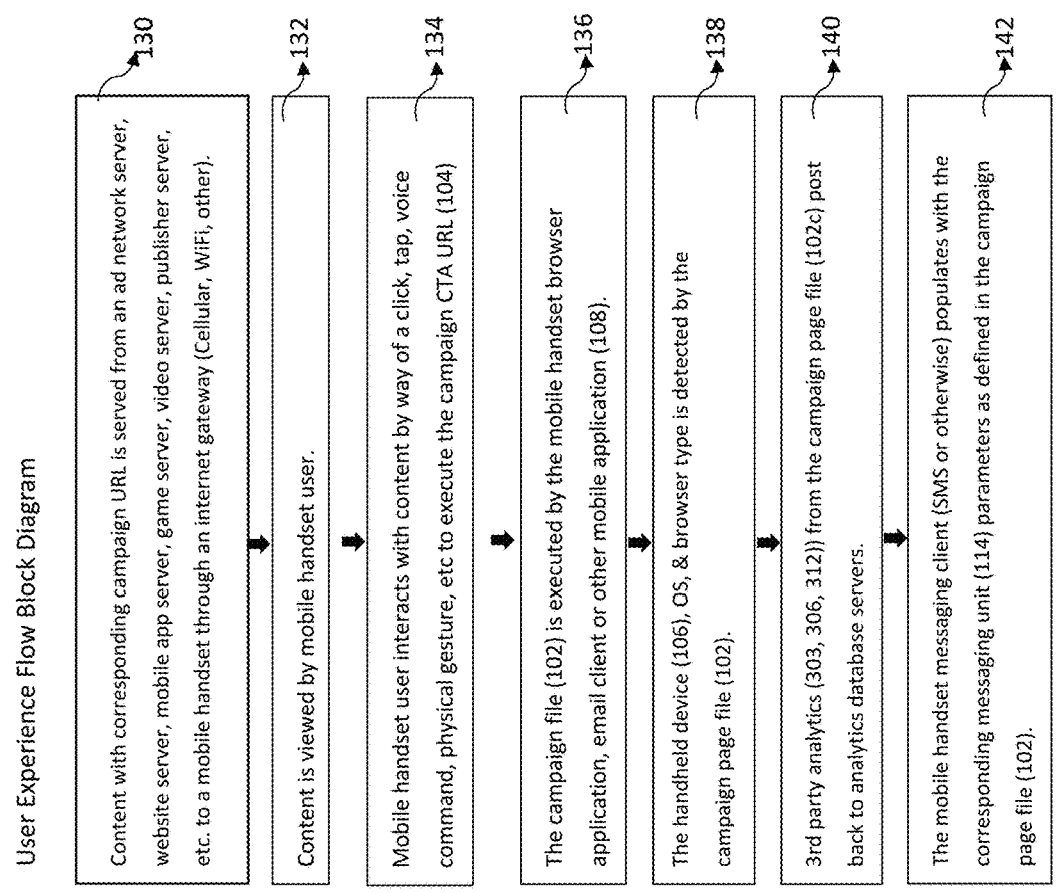
FIG. 15 illustrates an exemplary flow diagram of the User Experience in accordance with an embodiment of the present invention.
Figure 16:
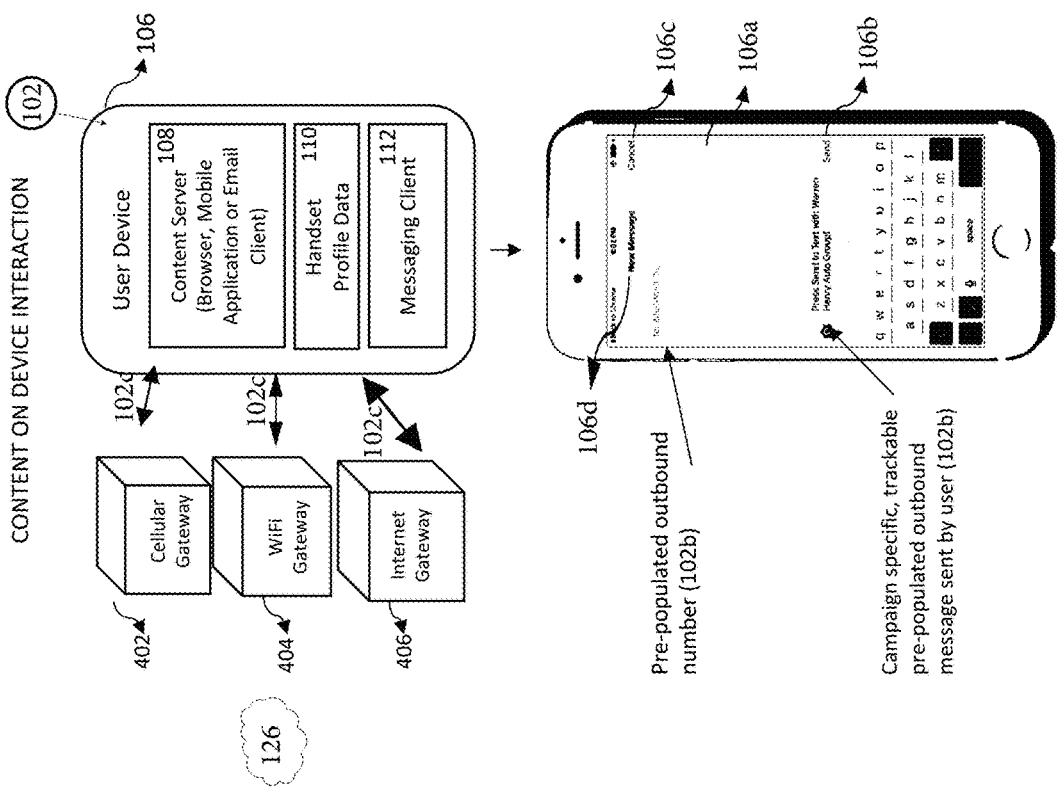
FIG. 16 illustrates an exemplary Content Interaction system diagram with an exemplary handheld device in accordance with an embodiment of the present invention.
Figure 17:
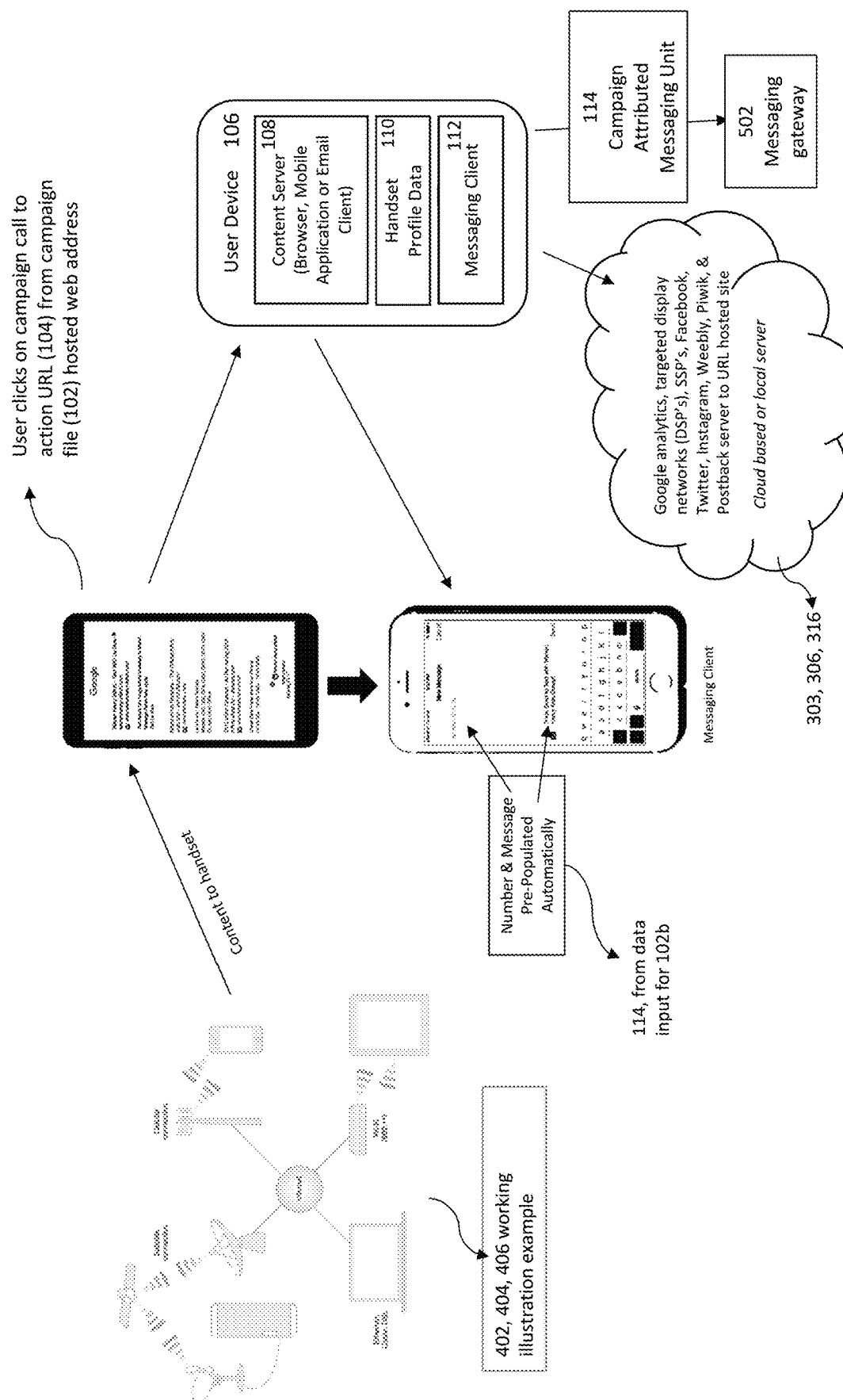
FIG. 17 is an alternative Content Interaction system diagram with an exemplary handheld device in accordance with an alternative embodiment of the present invention.
Figure 19:
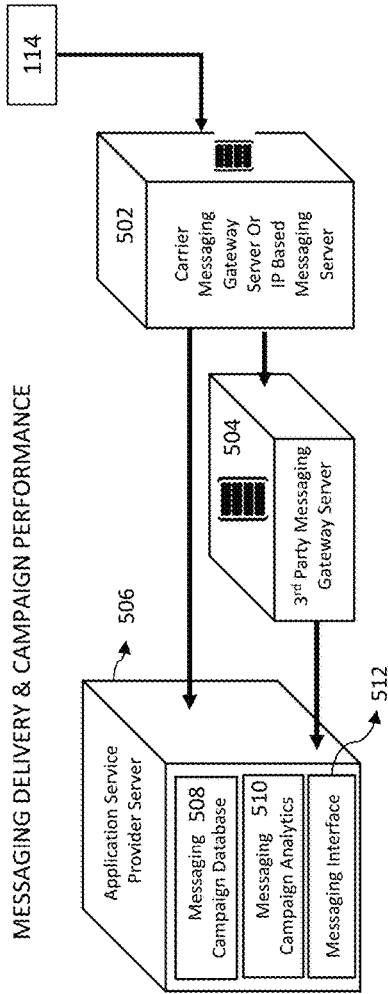
FIG. 19 is an exemplary Messaging Delivery and Campaign Performance network diagram in accordance with an embodiment of the present invention.
Figure 18:
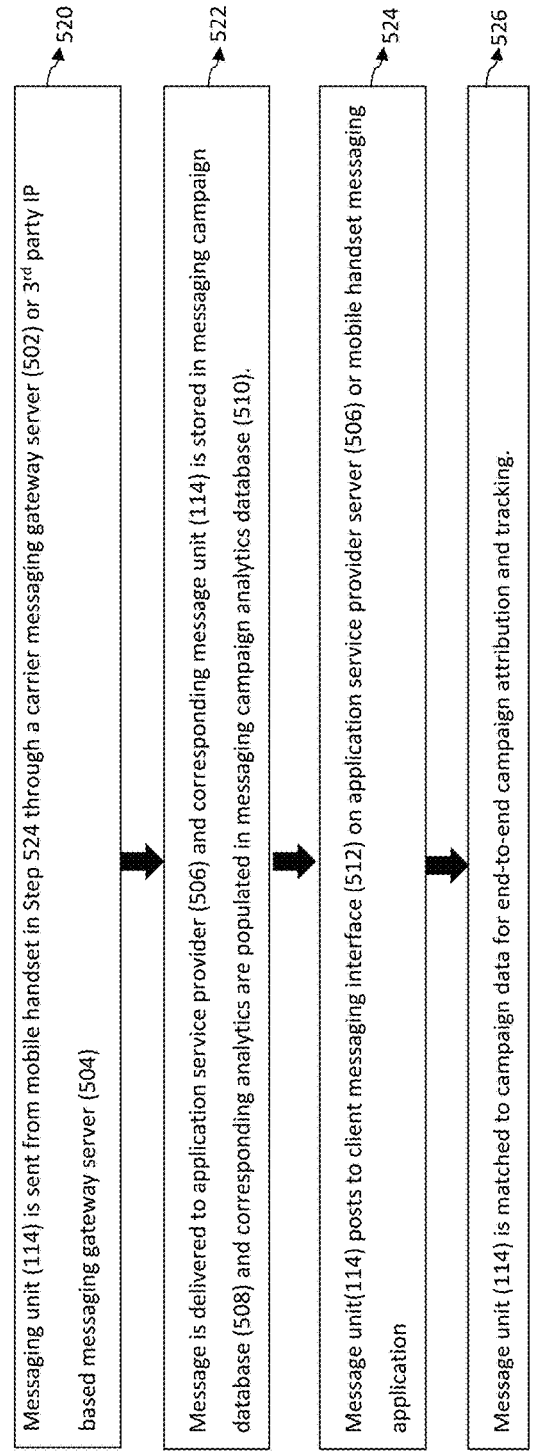
FIG. 18 is a process flow diagram of exemplary steps of the Messaging Delivery & Campaign Performance process in accordance with one embodiment of the present invention.

FIG. 3 generally illustrates the overview of the exemplary process where the Unified Campaign Platform Data Setup Process is further illustrated in FIGS. 4-5, Campaign Publishing Process is further illustrated in FIGS. 9-11, an Exemplary User Flow process is illustrated in FIGS. 14-15, an exemplary Content on Device Interaction is illustrated in FIGS. 16-17 and an Exemplary Messaging Delivery and Campaign Performance is illustrated on FIGS. 18 and 19.

Figure 3A:
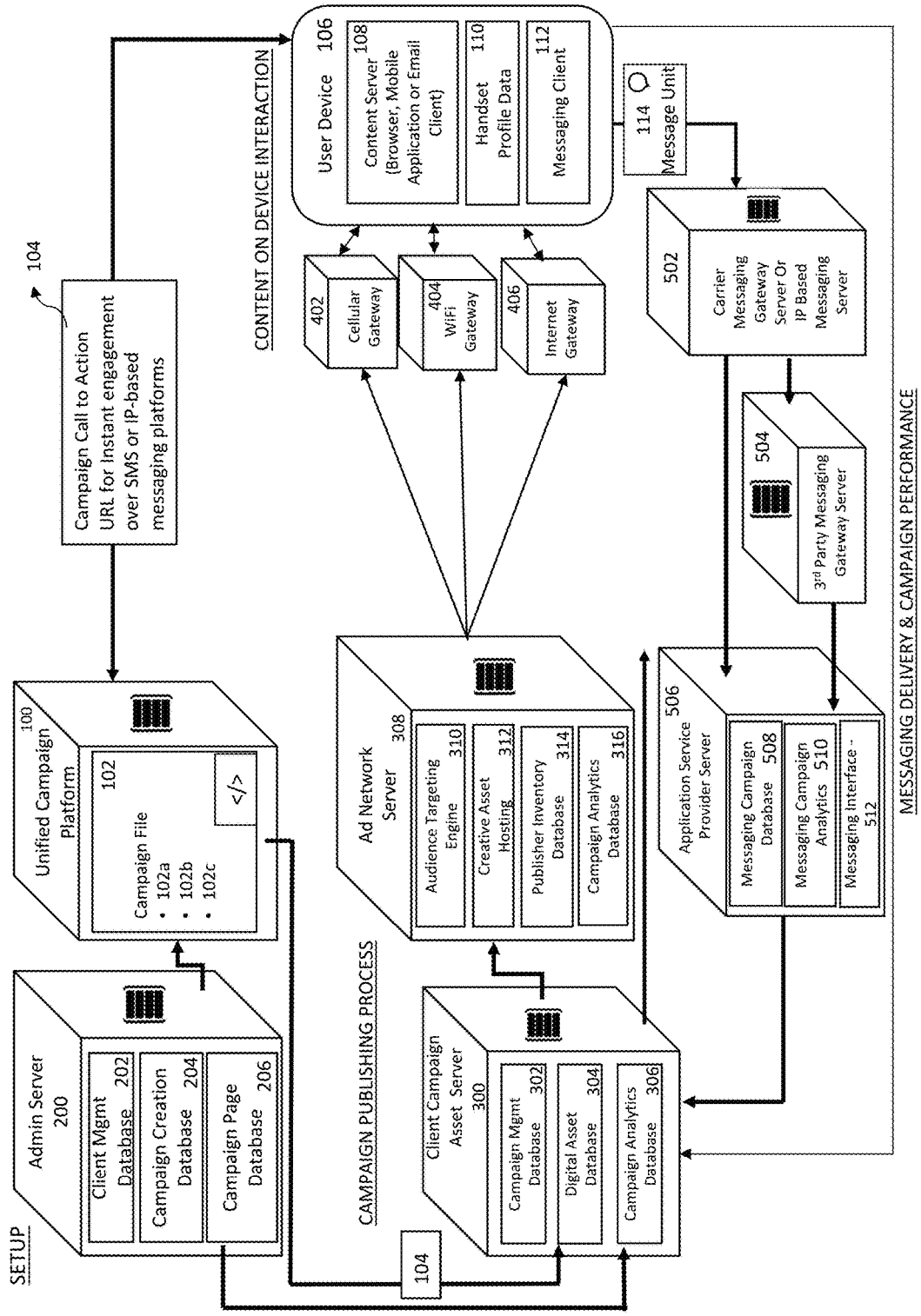
FIG. 3A is a detailed system block diagram illustrating exemplary processes in an exemplary system in accordance with the present invention.

FIG. 3A generally illustrates a more detailed system architecture overview for processing exemplary processes including, but not limited to, system configuration, publishing the marketing, for campaign and device interaction and campaign performance.

FIG. 4 illustrates the exemplary Unified Campaign Platform Data Setup process in which the Admin Server 200 generally includes a Client Management Database 202, a Campaign Creation Database 204 and a Campaign File Database 206. In one exemplary embodiment, the Client Management Database 202 may include, but is not limited to, data associated with a particular client such as client information, company information, website information and contact information. In one exemplary embodiment the Campaign Creation Database 204 generally includes information about the particular advertising, marketing or promotional campaign such as, but not limited to, message format, outbound message identification and prepopulated message data. In one exemplary embodiment, the Campaign File Database 206 generally includes information about the company, the call to action server or website to obtain additional information about the particular call to action marketing campaign. Each of these databases may be stored on multiple or at a single location with a single storage or multiple storage media, including remote storage and remote locations. In addition, each of these databases may be created using standard database creation techniques which are generally understood.

Admin Server 200 is generally a hosted storage of administrator client records and campaign parameters and custom text enabled URLs. Client Management Database 202 is generally a repository of data contained on an electronically retrievable storage media with information related to client information such as customer relations management data including, but not limited to, contact information, location information, technical information and website information. Campaign Creation Database 204 is generally a repository of data contained on an electronically retrievable storage media with information related to advertising campaign specific parameters such as an outbound number or ID and prepopulated message content. Campaign File Database 206 is generally a repository of data contained on an electronically retrievable storage media with information related to files stored locally or remotely related to a client and its advertising campaign and which are related to the client, a user or a customer. In the embodiment illustrated in FIG. 6, the Campaign File 102 is linked to the Campaign File Database 206 of the Admin Server 200.

In FIG. 4, Campaign Call to Action URL or Campaign CTA URL 104 is generally an automatically generated URL which indicates the web site address of an executable program for the Campaign File 102. In FIG. 3A, the Unified Campaign Platform 100 is generally a electronic computer system which retrievably stores and generates data for creating the messaging unit 114 for the handheld device 106 and embeddable tracking pixel used to generate tracking analytics for the prepopulated on-device message generated on the handheld device 106 based upon the Campaign File 102.

Generally, the Campaign File 102 contains the prepopulated content data and embeddable tracking pixel in an executable format for instructing the client web application or internet browser on the internet connected handheld device 106 to obtain data from an internet connected server located remotely associated with the advertising campaign when the Campaign CTA URL 104 is selected. Handset Detection 102a directs the handheld device 106 to obtain the correct version of the Campaign File 102 which is associated with the particular device type and operating system of the handheld device 106. Redirect and Messaging Variables 102b generally execute the desired target client application and provides the campaign specific prepopulated message content and outbound ID for communication between the desired target client application and the handheld device 106. The campaign or third party analytics 102c generally refers to the embeddable digital pixel also referred to as an embeddable tracking pixel which has uniquely identifiable data which allows for tracking and monitoring of the transmission and receipt of the embeddable digital pixel which may be collected for storage and manipulation by a third party remote server with a graphical user interface.

In the embodiment illustrated in FIG. 4, the Unified Campaign Platform 100 includes a campaign file 102 which includes, but is not limited to, handset detection data 102a associated with detecting a handheld device 106, redirect and messaging variables 102b along with analytics data associated with measuring and tracking campaign performance 102c, also referred to herein as campaign analytics. Generally, handset detection data 102a is automatically determined by transmitting a particular query automatically to the handheld device 106 during transmission of the campaign file 102 to the handheld device 106. The query may utilize standard techniques for querying the handheld device 106 including html, php, javascript, js libraries, pixel tracking and tag manager platforms. Generally, the Redirection and Messaging sequence 102b occurs automatically upon the receipt of the call to action campaign URL 104 which provide the address of a website server upon the execution of a "User Click" which initiates communication between the handheld device 106 and the website server which automatically transitions the handheld device 106 from an internet protocol to an instant message or IP based messaging protocol while simultaneously generating a trackable message.

Figure 8:
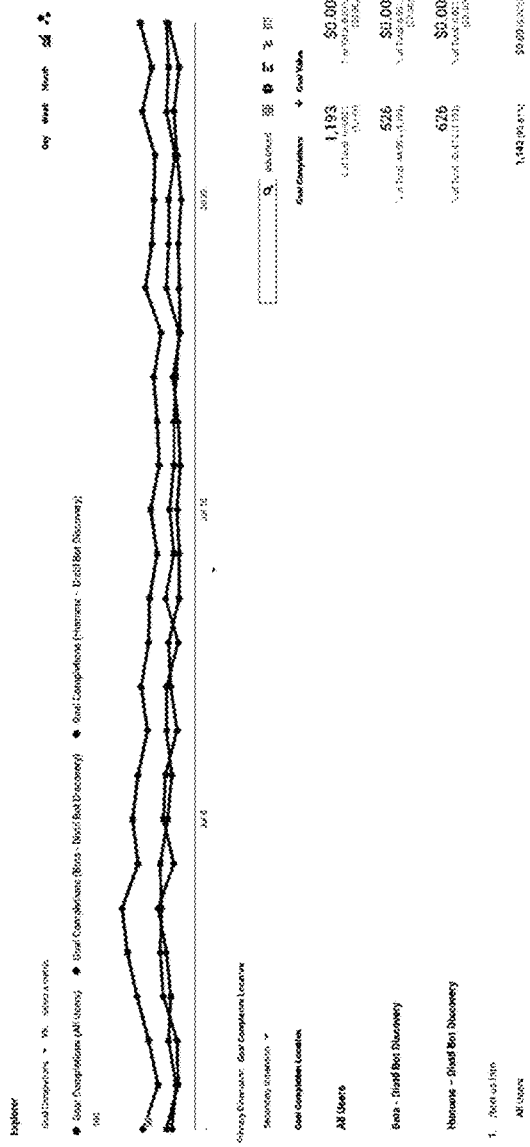
FIG. 8 is an exemplary $3^{rd}$ Party Analytics Dashboard in accordance with an embodiment of the present invention.

Generally, third party providers facilitate retrievable storage of data associated with the third party analytics tracking data along with measuring and displaying the obtained data. One example of a third party analytical platform is illustrated in FIG. 8 in which google analytics dashboard is utilized for hosting, measuring, displaying and manipulating system generated tracking data associated with the embeddable tracking pixel 102c which may be utilized for monitoring and tracking analytics data associated with the Campaign CTA URL 104.

FIG. 5 illustrates an exemplary flow diagram of the Setup Process in which the Admin Server 200 is configured for the collection and storage of client contact information in step 220, campaign parameters are configured and retrievably stored within the Campaign Creation Database 204 at step 222 which may include a record with, for example, but not as a limitation, a unique identifier, prepopulated message content and code associated with the embeddable tracking pixel, the record associated with a specific advertising campaign. At step 224 campaign parameters may be combined into an executable Campaign File 102 retrievably stored within the Unified Campaign Platform 100 with the handset detection 102a, redirect and messaging variables 102b along with the embeddable tracking pixel 102c. The Campaign File 102 may then be placed within the Unified Campaign Platform 100 at step 226 and the Campaign CTA URL 104 may be generated as a self-executable file and retrievably stored for selective transmission to the appropriate handheld device 106 during the advertising campaign as indicated at step 228.

FIG. 6 illustrates an exemplary embodiment of Admin Server 200 in communication with the Unified Campaign Platform 100 for selective transmission of the Campaign CTA URL 104. FIG. 7 illustrates an exemplary instance in which the Campaign File 102 is generated with various desired parameters including, but not limited to, company name, company domain, tag name and location along with other desirable parameters. In this way, the parameters may be customized to allow for simply or complex integration with various advertising platforms.

FIG. 9 illustrates an exemplary Advertising Network Server 308 in association with the Campaign Publishing process. The illustrated Advertising Network Server 308 is configured for direct receipt of communication from the handheld device 106 via the target client application such as, but not as a limitation, a messaging client 112. In the illustrated example, the Campaign CTA URL 104 is utilized to initiate SMS communications between the handheld device 106 and the Advertising Network Server 308. As further illustrated in FIG. 9, the Advertising Network Server 308 includes and Audience Targeting Engine 310, a Creative Asset and Target URL Hosting 312, a Publisher Inventory Database 314 and a Campaign Analytics Database 316. When creating the Advertising Campaign a Target URL is provided which is generally associated with the target of the advertisement such as a client website, landing page or other internet location which contains the desired advertisement. The present system and process allows for use of standard URL architecture to automatically generate a message based communication between the handheld device 106 and the Advertising Network Server 308 upon the selection of the Creative Asset 312.

Generally, the Advertising Network Server 308 is an online advertising network or advertising network server which connects advertisers to website that want to host advertisements and which provide hosted internet content in communication with handheld devices 106 via the internet and which provides and promotes for the marketing of products and services to consumers based upon client content using an hierarchical algorithm to target a desired consumer demographic based upon client provided parameters and which facilitates transmission of the embedded tracking pixel along with the advertising content to the consumer from a remote location. Some Advertising Networks aggregate advertisement from publishers and match it with advertiser demand. Examples of an Advertising Network Server 308 include, but are not limited to, paid search advertisers, publisher networks, display networks, social media networks and first party websites.

The Advertising Network Server 308 illustrated in FIG. 9, includes an Audience Targeting Engine 310, a Creative Asset Host 312, a Publisher Inventory Database 314 and a Campaign Analytics Database 316. The exemplary Audience Targeting Engine 310 allows for configuration of the target demographics of the prospective audience which may be based upon various social media parameters, pay per click parameters, impression based DSP and targeted websites. Generally, the Creative Asset Host 312 provides the retrievable storage media for hosting the creative asset and the URL which is retrievably stored on an Advertising Network Server 308. Generally, the Publisher Inventory Database 314 provides a repository of data contained on an electronically retrievable storage media with information related to websites and mobile applications which may be used to display creative asset content from a specified advertiser. Generally, the Campaign Analytics Database 316 provides a repository of data contained on an electronically retrievable storage media with information related to embeddable tracking pixels used for monitoring and tracking analytics by the Advertising Network Server 308 which are transmitted in the Campaign File 102 by the Campaign CTA URL 104. FIG. 10 illustrates an exemplary block flow diagram of the Campaign CTA URL 104 which is transmitted to the Client Campaign Server 300 and then to the Advertising Network Server 308 for retrievable storage as part of the Advertising Campaign.

FIG. 11 illustrates an exemplary flow diagram of the Campaign Publishing Process in which step 330 provides for the Campaign CTA URL 104 being transmitted to a client associated with a brand or company for retrievable storage on their server and which can be configured for association with their creative assets as desired. At step 332, tracking data associated with the embeddable tracking pixel from the campaign file 102 is sent from the 3rd party analytics provider is transmitted to the client for retrievable storage. At step 334 the Creative Asset Host 312 retrievably stores paid advertising and creative assets along with the Campaign CTA URL 104. Digital ad campaign analytics on the Campaign Analytics Database 316 of the Client Campaign Asset Server 300 are configured to correspond to the Advertising Network Server Campaign Analytics Database 316 at step 336. At step 338, data associated with the Advertising Network Server 308 is placed on the Paid Search Server, Publisher Ad Server or any Display Ad, web app or video ad through the necessary software platform. This may include the Campaign CTA URL 104 and corresponding creative asset. As indicated at step 340, organic listings may host the Campaign CTA URL 104 on a social media posting server, website server or aggregator site server.

Generally, the Client Asset Server 300 is an online database of interactive digital assets for transmission over the internet from the Client Asset Server 300 to the handheld devices 106 and may include, but is not limited to, brand, agency, publisher and company data. Client Management Database 302 is generally a graphical interface in communication with a repository of data contained on an electronically retrievable storage media with information related to a brand's advertising campaigns where the campaign CTA URL 104 and messaging parameters and reference notes are retrievably stored. This may include, but is not limited to, a locally or remotely hosted spreadsheet, CRM system or customized database. Digital Asset Database 304 generally refers to a repository of advertising data contained on an electronically retrievable storage media with information related to creative advertising asset such as, but not limited to, textual materials, visual images, sound recordings, animated images or video graphic recordings or any combination of any of the above works. Campaign Analytics Database 306 generally refers to a graphical interface with a marketing dashboard, advertising platform, tracking code platform which is accessible locally or remotely which contains the clients' internal digital campaign metrics and performance indicators. The clients' internal digital campaign metrics may include, but is not limited to, various keywords, tags and rankings as indicated on various search engines.

Figure 12:
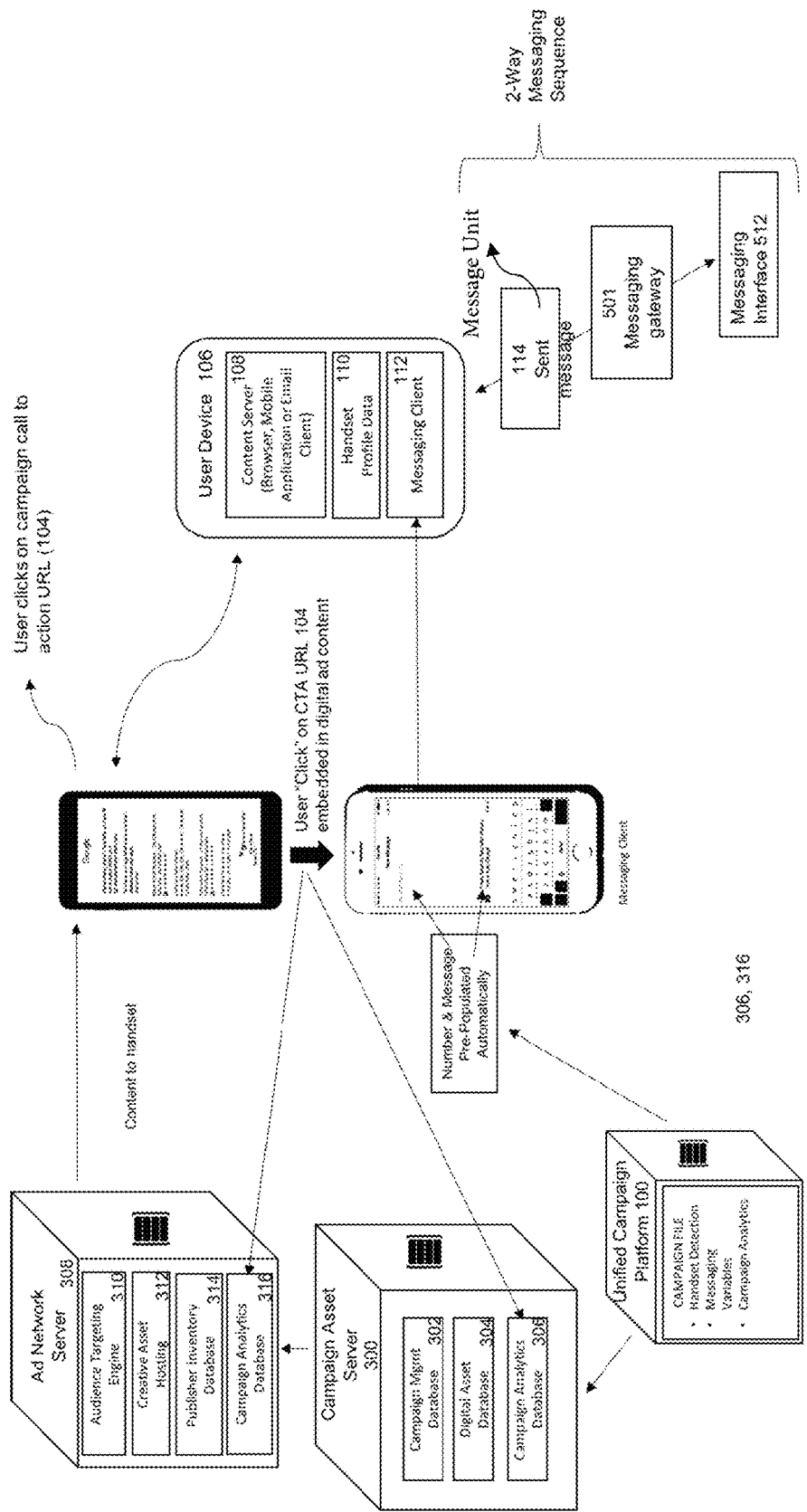
FIG. 12 is an exemplary system block diagram illustrating the Campaign Interaction Process of the Client Campaign Asset Server in accordance with one embodiment of the present invention.

FIG. 12 illustrates an exemplary embodiment of the Campaign Interaction Process with Client Campaign Asset Server 300. As depicted, the Advertising Network Server 308 provides content to the handheld device 106. Once the user selects the Campaign CTA URL 104, the handheld device transmits the embeddable tracking pixel to the Campaign Analytics Database 316 on the Advertising Network Server 308 and the Campaign Analytics Database 306 on the Client Campaign Asset Server 300 and opens the target application on the handheld device 106 such as the messaging client 112 in which the outbound number and message content are prepopulated as provided by the Unified Campaign Platform 100. The messaging client 112 initiates two-way communication through the messaging gateway 501 to the Messaging Interface 512.

Figure 13:
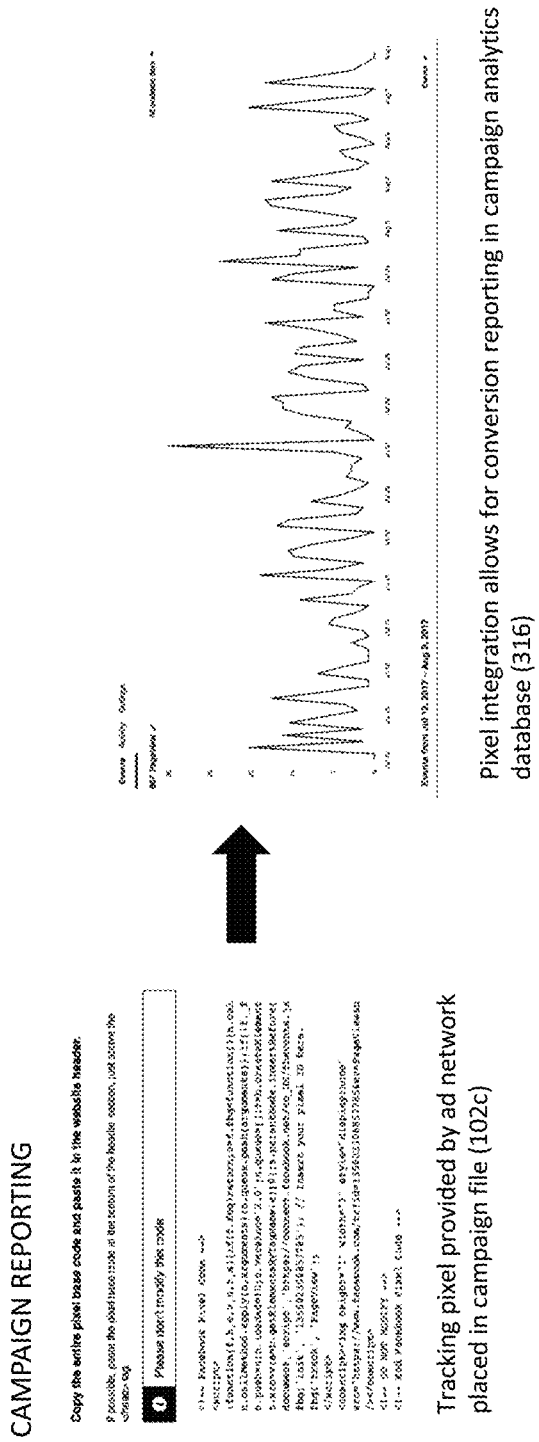
FIG. 13 is an exemplary Campaign Reporting feature illustrating exemplary code associated with an embeddable tracking pixel and graphical representation of aggregated tracking data obtained from a plurality of embeddable tracking pixels in accordance with one aspect of the present invention.

FIG. 13 illustrates an example of code associated with the embeddable tracking pixel 102c, which is aggregated for integration for conversion reporting diagram. The tracking data from the embeddable tracking pixel 102c aggregated within a 3rd party analytics platform illustrating an exemplary graphic used in monitoring, tracking and manipulating the tracking data associated with the embeddable tracking pixel 102c.

FIG. 14 illustrates an exemplary user flow diagram of the exemplary system in which a handheld device 106 is in communication with the Unified Campaign Platform 100 content server for communication between the handheld device 106 and a remote url. In FIG. 15, the user experience is initiated in step 130 upon receipt of a url which is placed online in association with the internet such as an ad network, paid search listing, website, social media site or creative asset server. Once the user views content 132, the user initiates the messaging sequence in step 134 by clicking on the url from any internet connected messaging capable handset or device 106 such as, but not limited to, a smartphone, tablet or pc based device. Depending on the particular device, the system determines the device type and the redirect and messaging sequence 102b of the unified campaign platform 100 initiates the redirect sequence for the specific device type. The redirect sequence 102b generally transmits data associated with a campaign file for execution by software associated with the handset such as a computer browser or computer operating system. Exemplary campaign data may include textual and numerical data including information related to the handheld device type along with a phone number or TCP-IP address associated with the handheld device 106, a user or handheld device identification, an abbreviated short code along with campaign specific prepopulated data such as outbound user data and outbound message data.

Tracking data may also be provided in the form of a beacon or other embeddable data which can be used to track and analyze information about the receipt and transmission of advertising campaign data received by the handheld device 106 and transmitted from the handheld device 106. Generally, the system may associate the embeddable tracking pixel 102c such as, but not limited to, a tracking beacon with a specific campaign for ubiquitous usage of the campaign file 102 across all web platforms. Generally, the integrated pixel is essentially a network call to a remote tracking server, which tracks clicks and usage data which can be associated with the campaign file 102 which has not been transmitted, is in the middle of transmission, or has been transmitted to the handheld device 106.

The tracking server (not shown) may be the same as the Admin Server 200, client campaign asset server 300 or ad network server 308, or it may be a different server. The data recorded by the tracking server may be provided later to the Ad Network Server 308 through the 3rd party analytics 102c as verification that the campaign file 102 was transmitted and received, while providing information about what or which handheld device 106 received the campaign file 102 or transmitted the automatically generated message unit 114.

As further illustrated in FIG. 14, the user may perform an action, such as a click, at step 122 through the user interface of the handheld device 106 or a remote server may redirect the handheld device 106 and automatically launch the handheld device's messaging client 112 based upon the campaign file 102 with embeddable campaign specific data such as a URL or SMS associated with an advertiser allowing for the transmission of the specified message with the prepopulated data, including outbound message id and messaging content, through the handheld device's messaging app. The behavior of a client messaging app or other target application during user interaction may be controlled with the campaign specific prepopulated data.

Generally, upon receipt of the campaign file 102 with the campaign file data, the handheld device 106 launches the messaging client 112 which is prepopulated with campaign specific data including outbound data associated with a particular phone number or IP address and prepopulated message data and campaign specific message content. In addition, the embeddable tracking pixel 102c or tracking beacon may be utilized simultaneously to transmit tracking data to the tracking server at the same time that the messaging client 112 is launched.

Prior to launching the messaging client 112, or other target application, the campaign file 102 may prompt the handheld device 106 to display a confirmation message to confirm the app has permission to proceed. Alternatively or additionally, as indicated in step 123, prior to transmitting the messaging unit 114, which is prepopulated with messaging content, the handheld device 106 may display the prepopulated message, automatically populated with the specific prepopulated data along with the user outbound message content, prompting the handheld device 106 for a "SEND" command. Upon completion, the messaging client 112 may close with the handheld device 106 returning to a normal condition.

Upon transmission of the embeddable tracking pixel 102c to the tracking server, data may be collected for use with a third party analytics platform such as, but not limited to, Google analytics, targeted display networks (DSP's), SSP's, Facebook, Twitter, Instagram, Weebly, Piwik & Postback server to URL hosted site.

An exemplary user experience flow block diagram is illustrated in FIG. 14, in which the handheld device 106 receives content from a corresponding campaign CTA URL 104 which is transmitted to the handheld device 106 from, for example, the Ad Network Server 308, which may include, but is not limited to, a Website Server (not shown), Mobile App Server (not shown), Game Server (not shown), Video Server (not shown), Publishing Server (not shown), Social Media Server (not shown) through the gateway server which may include one or more of the Internet Gateway 406, the WiFi Gateway 404 or the Cellular Gateway 402, for example.

As illustrated at step 132, the transmitted content may be displayed on the handheld device 106. Generally, the transmitted content may relate to a advertising campaign URL which may be transmitted as part of a mobile website, social media website, game application, gaming website, video, article or display ad. Execution of the call to action executable reference link also referred to as the campaign CTA URL 104 may be preformed by the handheld device 106 with for example a click, tap, voice command, physical gesture as indicated in step 134.

Once the campaign CTA URL 104 is preformed, the campaign file 102 automatically engages with the target application, like the messaging client 112 as indicated in step 136. The campaign file 102 inspects the handset profile data and detects the handheld device type, operating system and client internet browser as indicated in step 138 and simultaneously transmits handset profile data back to the Client Campaign Asset Server 300 and tracking data to the third party analytics database servers associated with the third party analytics platform as indicated in step 140.

Once the handset profile data and third party analytics data are transmitted, the handheld device 106 launches the target application 108 (also referred to herein as content server) as determined by the call to action executable reference link 104 which interfaces between the campaign files 102 on the Client Campaign Asset Server 300 and the handheld device 106. As further illustrated at step 142 and based in part upon the received campaign file 102, the handheld device 106 target application 108 is launched. In addition, a window associated with the Messaging Client 112 is displayed and prepopulated with the corresponding messaging data 114 and associated campaign data and other campaign file messaging unit parameters as provided by the campaign page file 102.

As illustrated in FIG. 16 the campaign page file 102 may be transmitted to the handheld device 106 simultaneously while tracking data 102c is transmitted to the third party analytics platform 126 via the Cellular Gateway 402, the WiFi Gateway 404, the Internet Gateway 406. Generally, the handheld device 106 includes a target content server application 108 also referred to herein as a target application or messaging client, may include a number of client applications like an internet browser, an email client or another mobile application for operation on a typical handheld device 106.

The exemplary handheld device 106 in use with the present invention also includes data associated with the handset profile data 110 and a messaging client 112 software program or application. A typical handheld device 106a displaying the prepopulated target app, a messaging client which contains the automatically generated prepopulated outbound number and campaign specific, trackable prepopulated outbound message. The "New Message" window 106d is displayed prior to transmission for approval and confirmation via the "Send" command 106b or rejection via the "Cancel" command 106c, both of which are displayed in the display window illustrated on the exemplary handheld device 106a.

The gateway server generally refers to any one of data transmitters which provide connectivity to the internet by a handheld device carrier and/or carrier handset such as the Cellular Gateway 402, WiFi Gateway 404, Internet Gateway 406 or other gateways which provide access to the internet for a mobile or wireless device. Generally a wireless device refers to a handheld device with internet connectivity and may include a device with handset profile data 110, which generally refers to data which is sent to the Client Campaign Asset Server 300 which retrievably stores device identifying data associated with the handheld device 106 in the campaign page files 104.

FIG. 17 illustrates an alternative embodiment of the Content on Device Interaction in which content is provided to the handheld device 106 through a series of data communication devices for selective engagement of the target Messaging Client 112 application which automatically prepopulates the New Message window with message content along with an outbound number for sending the message.

As further illustrated in the alternative embodiment of FIG. 17, the Campaign Attributed Messaging Unit or messaging unit 114 is sent from the handheld device 106 to the Messaging Gateway 501. FIGS. 18-19 illustrate an exemplary block flow diagram and system architecture diagram for the alternative embodiment of FIG. 17. At step 520, the Messaging Unit 114 is transmitted from the handheld device 106 through the messaging gateway server 502 to the Application Service Provider 506. Alternatively, the Messaging Unit 114 may be transmitted from an IP based Messaging Server 502 to a 3$^{rd}$ party Messaging Gateway Server 504 to the Application Service Provider Server 506. Once the Message is transmitted to the Application Service Provider Server 506, at step 522, the corresponding Message Unit 114 is retrievably stored in the Messaging Campaign Database 508 along with the corresponding analytics which are populated in the Messaging Campaign Analytics Database 510. At step 524, the Messaging Unit 114 is transmitted to the Client Messaging Interface 512 on the Application Service Provider Server 506 or the handheld device 106 messaging application. Then the Messaging Unit 114 is matched to campaign data for end-to-end campaign attribution and tracking.

As used in FIGS. 18-19, the Carrier Messaging Gateway Server 502 refers to the process in which the SMS/MMS/Carrier or Native message is routed through a carrier gateway. 3$^{rd}$ Party Messaging Gateway 504 generally refers to IP based messaging gateway servers. Generally, the Application Service Provider Server 508 includes the Messaging Campaign Database 508, the Messaging Campaign Analytics 510, the Client Messaging Interface 512 and the transmitted Messaging Unit 114. The Messaging Campaign Database 508 generally refers to a repository of data contained on an electronically retrievable storage media with information related to interactions hosted by the Application Service Provider Server 506. The Messaging Campaign Analytics 510 generally refers to any reporting based upon the aggregation of tracking data from the embeddable tracking pixels 102c. Client Messaging Interface 512 generally refers to any peer to peer or automated response messaging interface provided by the Application Service Provider Server 506 to any brand, agency or reseller. Messaging Unit 114 refers to the specific prepopulated message which provides for post-click tracking and attribution.

FIG. 20 illustrates an exemplary Application Service Provider Messaging Analytics report depicting the received messages which can be sorted by the prepopulated number from Redirect and Messaging Sequence 102b.

The embodiments detailed here are not meant to be exclusive. Other embodiments in which the handheld device is detected and directed towards communication via sms or ip based messaging protocols may be implemented in connection with the present invention. It is to be understood that while certain forms of the present invention have been illustrated and described herein with reference to the accompanying drawings, it is to be understood that a user of the present invention may choose any of the above embodiments, or an equivalent thereof, depending upon the desired application. In this regard, tit is recognized that various forms of the subject system could be utilized without departing form the spirit and scope of the present invention.

As is evident from the forgoing description, certain aspects of the present invention are not limited by the particular details of the examples illustrated herein, and it is therefore contemplated that other modifications and applications, or equivalents thereof, will occur to those skilled in the art. It is accordingly intended that the claims of any subsequent application shall cover all such modifications and applications that do not depart from the spirit and scope of the present invention.

According to embodiment of the present invention, the method is implemented as a computer program, namely, as a set of steps or a system utilizing any acceptable computer based platform. Thus, for example, the method may be a cross-platform java application, a standalone application written in native code, a distinct process built into a server, or part of an application server accessible across the internet using a handheld device or a web browser. One of ordinary skill in the art will appreciate that the steps or processes of the present invention are capable of being distributed in the form of a computer readable medium or using multiple processors on a single or multiple computers connected directly or separated by distance and that the present invention applies equally regardless. Such changes and modifications are to be understood as being included within the scope of embodiments of this invention as defined by any claims or a further non-provisional application.

What is claimed and desired to be secured by Letters Patent:

1. An electronic call to action system for automatically generating a prepopulated message, the electronic call to action system comprising:
    a campaign call to action URL embedded in multiple online advertisements;
    a unified campaign platform comprising an executable program having the campaign call to action URL as its website address;
    an administrative server in communications with the unified campaign platform, the administrative server storing a message content and an outbound ID associated with each of the multiple online advertisements on the website;
    wherein, upon activation of the call to action URL by one of the multiple online advertisements, the executable program of the unified campaign platform simultaneously executes both an HTTP protocol and an SMS or IP messaging application protocol;
    wherein the HTTP protocol:
        performs a device type detection query;
        generates tracking data associated with the advertisement, the device type, the embedded tracking pixel, and a time at which the campaign file is assembled; and,
        transmits the tracking data to an analytics platform;
    wherein the SMS or IP messaging application protocol:
    assembles a campaign file comprising the message content, an embedded tracking pixel, and the outbound ID associated with the one of the multiple advertisements, and which is configured for the mobile device type; and
    generates a prepopulated message on an SMS application or an IP messaging application of the mobile device, the prepopulated message comprising the message content, the embedded tracking pixel, and outbound ID.

2. A method for automatically generating a prepopulated message said method including the steps of:

a) providing a campaign call to action URL embedded in an advertisement on a web site;
b) providing a unified campaign platform at the campaign call to action URL, the unified campaign platform comprising an executable program;
c) mobile device with an SMS application or an IP messaging application activating the unified campaign platform through the campaign call to action URL;
d) the unified campaign platform identifying the type of device by performing a device type query on the mobile device;
e) the executable program of the unified campaign platform creating a campaign file at said unified campaign platform, the campaign file including message content and an outbound ID, wherein the campaign file is configured for the device type;
f) transmitting the campaign file to the mobile device;
g) the SMS application or IP messaging application of the mobile device creating a prepopulated message comprising the message content, and the outbound ID; and
h) upon receipt of a confirmation command, the SMS application or IP messaging application sending the prepopulated message to a client messaging interface.

\* \* \* \* \*